May 29, 1928.
A. L. BAUSMAN
1,671,666
METHOD AND APPARATUS FOR TEMPERING CHOCOLATE AND THE LIKE
Filed May 12, 1926    2 Sheets-Sheet 2
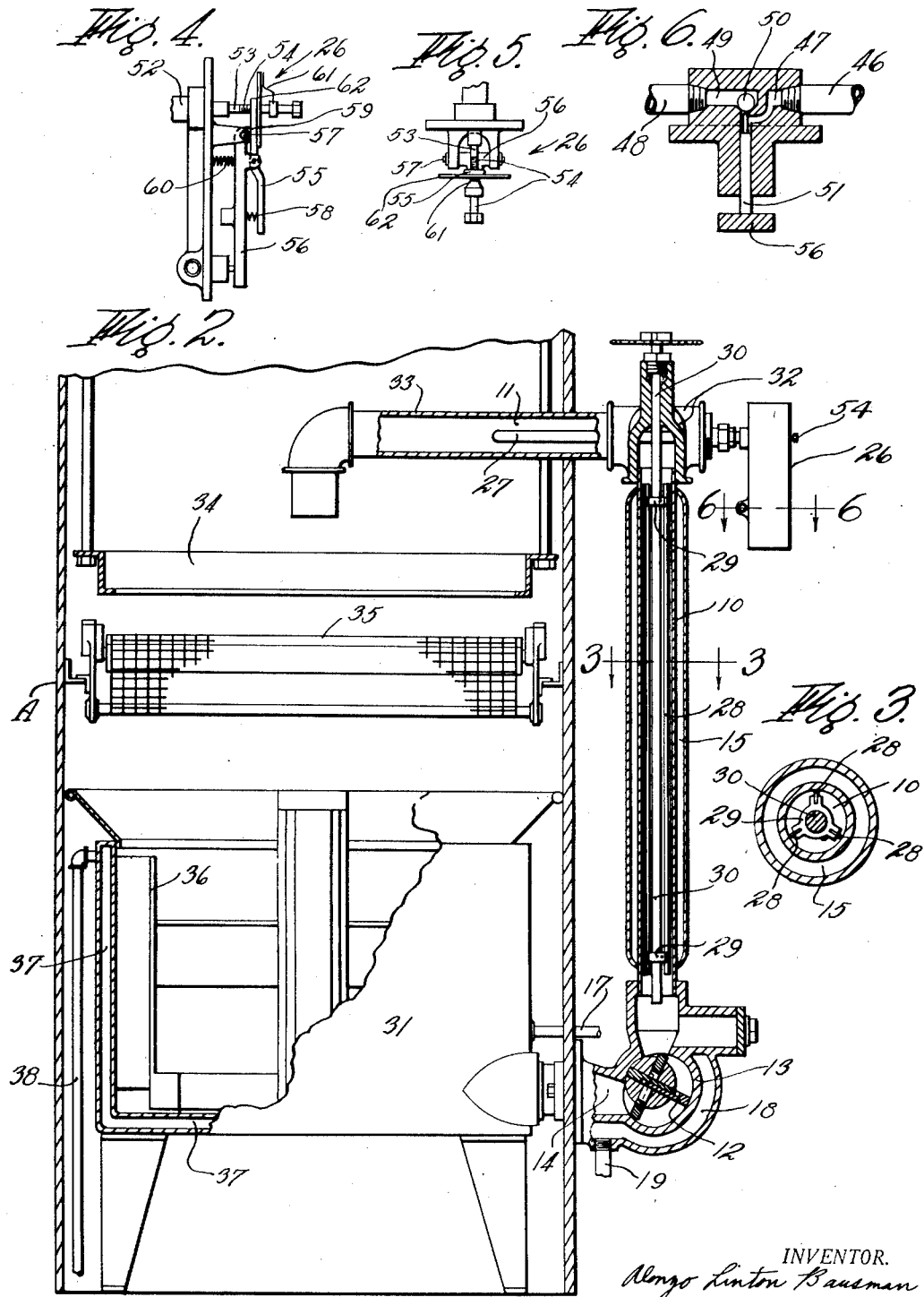

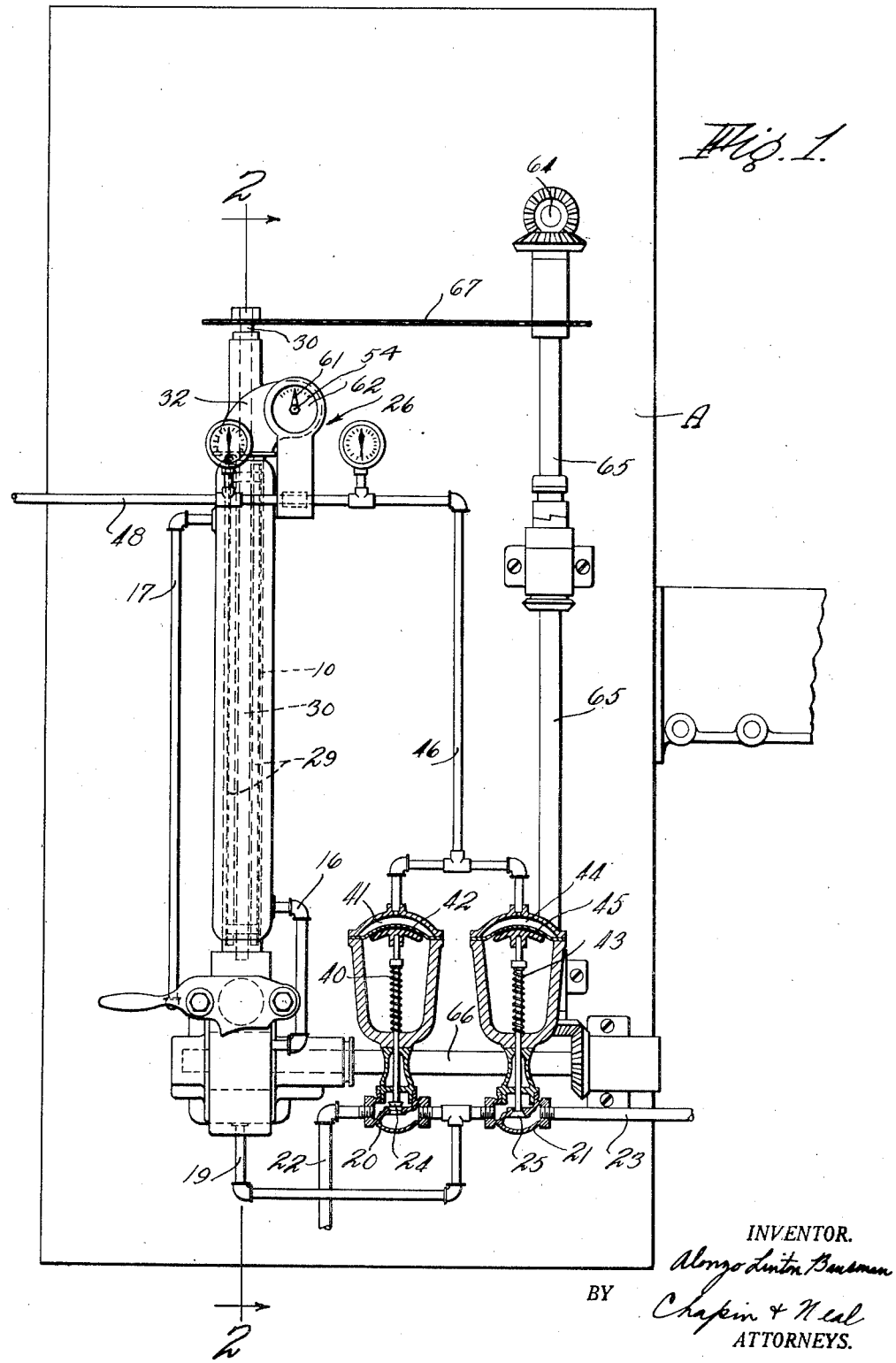

Patented May 29, 1928.

1,671,666

UNITED STATES PATENT OFFICE.

ALONZO LINTON BAUSMAN, OF SPRINGFIELD, MASSACHUSETTS, ASSIGNOR TO NATIONAL EQUIPMENT COMPANY, OF SPRINGFIELD, MASSACHUSETTS, A CORPORATION OF MASSACHUSETTS.

METHOD AND APPARATUS FOR TEMPERING CHOCOLATE AND THE LIKE.

Application filed May 12, 1926. Serial No. 108,637.

This invention relates to a method and apparatus for tempering chocolate and the like.

The broad purpose of the invention is to provide a method and apparatus for tempering large bodies of chocolate, and especially for tempering relatively large streams of chocolate while in motion, whereby sufficiently rapid temperature changes may be effected in such bodies or streams, under a thermostatic control responsive to temperature variations in the chocolate at a given point, to maintain the chocolate at said point, within exceedingly narrow limits, at a substantially constant and predetermined temperature.

It is well known that chocolate for coating candies must be maintained, within close limits, at a predetermined temperature for the best results, and as a practical matter, it has been usual to regulate the temperature of the chocolate by manually controlling the admission of the heating medium supplied to the various temperature-controlling jackets, such as those for the chocolate supply tank, its pump and discharge conduit. If the chocolate becomes too cool, it can be quickly heated up but, if it becomes too warm a quick cooling cannot be effected because the practice is merely to shut off the heating medium and allow the chocolate to gradually cool by radiation. The regulation of the temperature of relatively large bodies of chocolate has heretofore been effected under thermostatic control, but generally speaking, such control has had the same disadvantage as above set forth. That is, the valve controlling the heating medium has been thermostatically controlled and arranged to open if the chocolate is too cold and close if the chocolate is too hot. The arrangement while functioning to keep the chocolate from falling below a predetermined temperature is not effective to prevent it from rising above that temperature. Such an arrangement, therefore, lacks the necessary provisions for maintaining the chocolate at substantially a constant temperature because there are no means for quickly cooling the chocolate.

The difficulty attending the provision of adequate means for quickly cooling large bodies of chocolate is that a temperature sufficient to produce a quick change in the large mass of chocolate, especially while that mass is moving rapidly, must be far below the freezing point of chocolate, wherefore the chocolate, in those portions adjacent the confining and jacketed walls will freeze and adhere to such walls. A subsequently applied high temperature will, of course, free the chocolate from such walls but the chocolate, thus freed, falls away from the walls in lumps which are carried through the discharge conduit into the coating machine or other point of delivery.

In my prior U. S. Patent No. 1,141,683, dated June 1, 1915, I disclosed a tempering machine with provisions for automatically maintaining the temperature of chocolate, within narrow limits, at a substantially constant and predetermined temperature by alternately admitting hot and cold air under thermostatic control. The success of that machine, however, depended on tempering the chocolate while it was spread out in a very thin sheet on a large drum. The low temperatures had to be applied only during short intervals because, since the chocolate was spread over a large area in a thin sheet, the temperature change in the chocolate was effected quickly. The cold air would be shut off long before the chocolate could freeze.

As distinguished from that machine, I temper the chocolate in ordinary quantities and under the conditions existing, say in a chocolate coating machine. To effect a quick change of temperature in a thick stream of chocolate, as it flows through a relatively large pipe, by means of a cooling medium admitted to a jacket encompassing said pipe, it will be apparent that the cooling medium must be admitted for long enough intervals to enable the heat exchange to penetrate into the thick stream. This means that the chocolate adjacent the walls will be cooled more quickly than in the center and the fact is that it will freeze and adhere to the inner wall of the conduit unless prevented by some special method or means.

The provision of such a method and means constitutes a special and important purpose of this invention. It is important because it renders possible the tempering treatment of chocolate in large volumes and under ordinary working conditions by thermostatically-controlled means which will maintain the chocolate at substantially a constant temperature. Such means constitutes the secret of success to the solution of the stated problem and enables the use of a thermostatic control which will adequately effect the desired result of maintaining the chocolate within narrow limits at the desired predetermined temperature.

According to my method, cooling and heating mediums are applied alternately under thermostatic control to a jacket or jackets, encompassing the confining wall or walls for the body of chocolate to be tempered and the inner surfaces of said confining walls are traversed continuously by means which keep the chocolate from freezing during the application of the cooling medium to said jackets.

More particularly, the invention is directed to tempering the chocolate while it is flowing through a conduit to a point of delivery with the object of keeping the temperature of the chocolate at said point within very narrow limits at a constant temperature and also to keep the chocolate free from lumps and otherwise in proper condition for use.

To this end, a temperature controlling jacket is provided over substantially the entire length of the discharge pipe and heating and cooling mediums, such as steam or hot water and cold water (as cold as can be obtained from the city supply) are alternately admitted to this jacket under the control of a thermostat, the sensitive portion of which is located in the stream of chocolate at or near the delivery point of the discharge conduit. One or more scrapers traversing the inner wall of the conduit, over that length thereof which is acted upon by said mediums, prevent the chocolate from freezing to the wall of the conduit and also serve as a means for equalizing the temperature of the chocolate over the cross sectional area of the stream. That is, the chocolate in various parts of the cross sectional area of the stream is affected to different degrees by the temperature changing mediums and the scrapers continually mix the outer parts of the stream with the inner parts and by this compensatory action render the temperature substantially uniform in all parts of the stream.

Other objects and advantages will appear in the following description and will be pointed out in the appended claims.

The invention will be disclosed with reference to the one illustrative embodiment of it in the accompanying drawings, in which:

Fig. 1 is a side elevational view of a chocolate coating machine showing the invention as applied thereto;

Fig. 2 is a cross sectional view taken on the line 2—2 of Fig. 1;

Fig. 3 is an enlarged sectional plan view taken on the line 3—3 of Fig. 2;

Figs. 4 and 5 are enlarged side elevational and top plan views, respectively, of the thermostat shown in Figs. 1 and 2,—the casing of the thermostat having been removed to reveal the interior mechanism; and Fig. 6 is an enlarged cross sectional view taken on the line 6—6 of Fig. 2.

Referring to these drawings and particularly to Fig. 2; 10 represents a conduit through which the chocolate flows, or is caused to flow, in a stream of considerable cross sectional area and at a considerable velocity. In the present instance, this conduit is vertically disposed and means are required to cause an upward flow of the chocolate to its delivery point 11. Such means may take the form of a suitable pump, such as the rotary pump shown, which comprises an impeller 12 mounted to revolve in a casing 13. Chocolate, supplied to the latter by the pipe 14, is forced by the impeller 12 into the lower, and inlet end of conduit 10, to which the pump is connected, and thence upwardly through the conduit to the delivery point 11. Encompassing conduit 10 throughout the major portion of its length is a jacket 15 which is connected near one end to an inlet pipe 16 (Fig. 1) and near the other end to an outlet pipe 17.

In the present case, the inlet pipe 16 receives its supply of the temperature-conditioning medium through the intermediary of a jacket 18 (Fig. 2) provided in the pump casing 13, from an inlet pipe 19, although this arrangement is not essential in so far as the broader features of the invention are concerned. Pipe 19 is connected, as shown in Fig. 1, to valve casings 20 and 21 which are respectively connected to supply pipes 22 and 23 for heating and cooling mediums. In this particular case, steam is supplied to pipe 22 and cold water (as cold as is available from the ordinary city supply), is supplied to pipe 23.

The valve casings 20 and 21 contain valves 24 and 25, respectively, which are alternately operable (by means to be described) under the control of a suitable thermostat, such as that designated generally at 26, the sensitive element 27 of which is located in, or near the delivery end of conduit 10 so as to be responsive to temperature variations in the stream of chocolate leaving the conduit 10. When the cold water valve is closed, the steam valve is opened and vice versa. When the temperature of the chocolate rises a fraction above the desired predetermined temperature, the thermostat, in any suitable manner, causes the steam valve to close and the cold water valve to open and, when the temperature of the chocolate falls a fraction below the predetermined temperature, the steam valve is opened and the cold water valve is closed.

Thus, heating and cooling mediums are alternately admitted to jacket 15 and the respective temperatures of these mediums are so far above and so far below the freezing point of chocolate that they are adapted to, and capable of, producing exceedingly quick changes in the relatively large stream of chocolate while it is travelling at a rapid rate to the delivery point. The instant that the temperature of the chocolate, flowing past the sensitive element 27, varies a fraction from the desired temperature a quick temperature change is produced in jacket 15 to correct the temperature of the chocolate at points in the stream behind the delivery point. The result is that the chocolate, as delivered, is maintained within narrow limits at the desired predetermined temperature.

Naturally, the chocolate is affected to various degrees in various parts of the cross sectional area of the stream by the temperature changing mediums. The outer portions of the stream are heated or cooled more quickly and to a greater degree than the inner portions of the stream. Thus, the temperature changes produced are not uniform over the cross sectional area of the stream, whereas uniformity is essential and required at the delivery point. Also, the fact that the temperature-changing mediums are purposely made so widely different in temperature from that of the chocolate to secure quick changes on large and moving bodies of chocolate, aggravates the condition of non-uniformity. The temperature control described would wholly fail, as a practical matter, unless the device next to be described, or something having an equivalent function, were provided.

That device consists of one or more blades 28 (three as shown) which traverse the inner wall of conduit 10 over the entire length thereof which is subjected to the action of the temperature-changing mechanism. As shown, these blades consist of flat strips, which are secured near each end to spiders 29 carried by a rotatable shaft 30. The blades 28 revolve continuously and their outer edges engage the inner wall of conduit 10. While these blades are continually in motion, it is during the intervals of admission of the cooling medium to jacket 15 that the blades 28 are primarily required and they then function to keep the chocolate in motion in the outer peripheral portions of the stream of chocolate and prevent the troubles which would otherwise occur due to the solidifying of the chocolate in such portions of the stream. If the chocolate freezes to the inner wall of conduit 10, it is scraped off almost as soon as it freezes thereto and is thereafter mixed with the warmer portions of the chocolate near the center of the stream. The blades 28 not only serve to prevent the difficulties, which would otherwise arise by freezing of the chocolate in the outer portions of the stream, but they also serve as stirrers and cause the hot and cold parts of the stream to be intimately mixed and equalized in temperature. Thus, the disadvantage of the arrangement by reason of its tendency to non-uniformity of temperature over the cross sectional area of the stream is corrected and overcome. Also, the blades 28, or their equivalent, constitute a prerequisite to the successful use of very cold cooling mediums for the purpose of quickly effecting temperature changes in a relatively thick stream of chocolate moving at substantial velocity.

As a matter of fact, the jacket 15 will be alternately so cold and so hot as to be uncomfortable to touch. When the cold water is admitted to jacket 15, the latter feels ice cold and is merely so because the water used is as cold as can be obtained and is oftentimes between 40 and 50 degrees in temperature. The admission of such cold water to jacket 15 has been proved, by actual demonstration of the apparatus with blades 28 removed, to result in the solidification of the chocolate for substantial distances into the stream, thus seriously clogging the conduit 10. With such a condition, when the steam is later turned on, the frozen chocolate thaws first in those portions contiguous with the inner wall of conduit 10 and becomes free from this wall before the entire body of frozen chocolate has melted. Thus, the chocolate falls off from the conduit in lumps, which, while they may later be broken up to some extent, nevertheless render the chocolate lumpy and unfit for use.

The invention, as heretofore disclosed, is independent of any specific use. It is capable of various uses wherever one desires to maintain chocolate within close limits at a constant temperature. One example of a most important use is in connection with a chocolate coating machine and the invention has been illustrated in connection with this specific use for exemplary purposes. Other uses will readily occur to those skilled in the art and, accordingly, the invention is considered in its broader aspects as independent of the particular use now to be described.

A represents the casing of a standard and well known type of chocolate coating machine, in the base of which is a chocolate supply tank 31. The outlet of this tank is connected to the pipe 14, above described.

Accordingly, chocolate from tank 31 is supplied to the pump casing 13 and forced by the impeller 12 up conduit 10 to a level available for use for the coating function. As shown, conduit 10 is disposed outside casing A and is connected by a special fitting 32 to a horizontal pipe 33, which forms the outlet or delivery part of conduit 10 and in which the sensitive element 27 of the thermostat, above described, is located. Chocolate, tempered as heretofore described, is delivered from pipe 33 to a shower pan 34. From the latter, chocolate falls in a transverse stream upon, and envelops, rows of candy centers carried by a wire mesh conveyor 35, which moves in a horizontal path longitudinally through casing A (from left to right as viewed in Fig. 1). Excess chocolate, not used for coating the candies, falls through the meshes of conveyor 35 back into the open upper end of the underlying supply tank 31.

The latter contains the main body of chocolate. Additions are made to it from time to time and the added portions, as well as those unused portions returned to it through the meshes of conveyor 35, need to be stirred into the mass and conditioned as to temperature and otherwise. Such conditioning is effected in part by a rotatable stirrer 36, which not only keeps the mass in a constant state of agitation and thoroughly mixed but also exerts a raising effect on the chocolate to free the same from air bubbles.

A jacket 37 for the reception of a temperature changing medium is provided for the base and peripheral walls of tank 31 and the outlet pipe 17, heretofore described, may be connected to this jacket as shown (although the ordinary temperature changing medium may be used, according to some features of the invention, if desired).

As shown, the cooling or heating medium, as the case may be, is admitted first to the pump jacket 18, and thence passes to the jacket 15, which encompasses the conduit 10, and afterward passes to the tank jacket 37, from which it overflows into a pipe 38. The stirrer 36 and the pump impeller 12 serve, in addition to their ordinary functions, to prevent the chocolate from freezing to the inner walls of the tank and pump casing, respectively, during the periods when the cooling medium is applied. The distinction in the practice described, over that heretofore prevailing, is that the cooling medium is a freezing medium, in so far as chocolate is concerned, and being applied to a jacket having a thin metallic wall, on which the chocolate is not spread out in a thin sheet, solidification of the chocolate would occur unless the means, above described, were provided to prevent it, or to prevent the disadvantageous conditions which would follow, as above set forth, if freezing were allowed to occur.

Referring now to the details of the exemplary apparatus shown, the valves 24 and 25 are of similar but reversely arranged types. The valve 24 is arranged to open, by the expansive action of a spring 40 and to close when fluid under pressure, such as compressed air, is admitted to a chamber 41 to force down a diaphragm 42 attached to the stem of valve 24. Valve 25 is arranged to close by the expansive action of a spring 43 and to open when fluid under pressure is admitted to a chamber 44 and allowed to act on diaphragm 45 attached to the stem of valve 25. The chambers 41 and 44 are connected by a pipe 46 to a chamber 47 (Fig. 6) in the frame of thermostat 26. Compressed air from a suitable source is admitted by a pipe 48 into a chamber 49 in said frame. Communication between the chambers 47 and 49 is normally prevented by a ball valve 50 which is moved toward and held on its seat by the pressure of the air in chamber 49. The valve is moved away from its seat, to permit compressed air to enter chamber 47, by a plunger 51, which is slidably mounted in said frame, and operated by the thermostat. In the particular thermostat herein disclosed, the compressed air admitted to the chambers 41 and 44 escapes by leakage, as for example around the stem 51.

The thermostat element 27 has a part 52 which passes out through fitting 32 and is fixed to the frame of the device 26. Inside part 52 is a member 53 which moves in or out with respect to part 52 as the temperature in pipe 33 diminishes or increases. The end of part 53 abuts a screw 54 adjustably mounted in one end of a lever 55 which is pivoted intermediate its ends to a second lever 56. The latter is pivoted at one end at 57 to the thermostat frame and at its other end bears on the plunger 51, above described. Interposed between levers 55 and 56 is a relatively heavy spring 58 which normally holds a portion of lever 55 (on the opposite side of its pivot from the spring) against a flat surface 59 on lever 56. Normally, and so far as need be considered here, the two levers 55 and 56 move as if they were integral, being moved in one direction by the expansible member 53 and in the other direction by a spring 60, whereby valve 50 may be opened or allowed to close. The valve 50 closes by the pressure of the air back of it. To change the predetermined temperature, at which valve 50 will open, it is simply necessary to turn screw 54. The latter carries a pointer 61 which shows by its position with relation to a graduated disc 62 fixed to lever 55, the temperature for which the valve is set to open.

The pump and scrapers 28 may be driven in any suitable manner. In the present case, they may be conveniently driven from one of the power shafts, such as 64, of the coating machine. Shaft 64 drives through bevel gears a vertical shaft 65, which in turn drives by bevel gears a horizontal shaft 66 which extends into the pump casing and is suitably connected to the pump impeller 12. The shaft 30, carrying scrapers 28, extends through and above the upper end of the conduit 10 and is driven from shaft 65 by a chain 67 and suitable sprockets, as indicated.

The operation will sufficiently appear from the preceding description.

The invention has been disclosed herein, in an embodiment at present preferred, for illustrative purposes but the scope of the invention is defined by the appended claims rather than by the foregoing description.

What I claim is:

1. The combination with a conduit through which a relatively large stream of chocolate is adapted to flow and a temperature controlling jacket for said conduit, of means responsive to variations in the temperature of the chocolate at a given point in said conduit to produce a relatively high temperature or a relatively low temperature in said jacket accordingly as the temperature of the chocolate at said point is less or greater, respectively, than a predetermined temperature, said relatively low temperature being well below the freezing point of chocolate, and means for preventing the chocolate from freezing to the inner wall of said conduit while a condition of relatively low temperature prevails in said jacket.

2. The combination with a conduit through which chocolate is adapted to flow and a temperature controlling jacket for said conduit, of means for alternately admitting a heating medium and a cooling medium to said jacket to produce rapid changes in temperature in the relatively large body of chocolate while it is moving through said conduit, means responsive to variations in temperature of the chocolate near the discharge end of said conduit to operate said means and maintain the chocolate at said discharge end within narrow limits at substantially a constant temperature, and means for preventing the chocolate from freezing to the inner wall of said conduit during the intervals of admission of said cooling medium.

3. The combination with a conditioning tank for chocolate or the like, of a pump, a conduit through which chocolate from the tank is forced by the pump, a temperature controlling jacket associated with said conduit, connections for admitting a heating medium and a cooling medium to said jacket, a valve to control the admission of the heating medium, a valve to control the admission of the cooling medium, and a thermostat responsive to variations in the temperature of the chocolate near the discharge end of said conduit and adapted to open the valve for the cooling medium and close the valve for the heating medium and vice versa accordingly as the temperature of the chocolate near the discharge end of said conduit is greater or less than a predetermined minimum.

4. The combination with a conditioning tank for chocolate or the like, of a pump, a conduit through which chocolate from the tank is forced by the pump, a temperature controlling jacket associated with said conduit, connections for admitting a heating medium and a cooling medium to said jacket, a valve to control the admission of the heating medium, a valve to control the admission of the cooling medium, a thermostat responsive to variations in the temperature of the chocolate near the discharge end of said conduit and adapted to open the valve for the cooling medium and close the valve for the heating medium and vice versa accordingly as the temperature of the chocolate near the discharge end of said conduit is greater or less than a predetermined minimum, and a scraper traversing the inner wall of said conduit to prevent the chocolate from freezing thereto during intervals of admission of the cooling medium to said jacket.

5. The combination with a conditioning tank for chocolate and the like, of a pump for drawing chocolate from said tank, a conduit through which the chocolate is forced by said pump; temperature controlling jackets associated with said tank, pump and conduit; connections to admit a heating and a cooling medium to said jackets, a valve for each of said connections, a thermostat the sensitive element of which is located in said conduit near the discharge end thereof, and means controlled by said thermostat for operating said valves, closing one and opening the other and vice versa.

6. The method of maintaining chocolate for coating and like purposes within narrow limits at a predetermined temperature at or near the point of delivery for the coating or other operation, which consists in admitting to the jackets of the chocolate supply tank, its pump and discharge conduit a heating medium whenever the temperature of the chocolate at said point falls below said predetermined temperature, and in admitting to said jackets whenever the temperature of the chocolate at said point rises above said predetermined temperature, a cooling medium sufficiently cold to freeze the chocolate adjacent the walls of said jackets, and in continuously scraping the chocolate from said walls to prevent it from solidifying during the application of the cooling medium.

7. The method of tempering relatively large bodies of chocolate or the like, which consists in alternately subjecting the confining walls for the body of chocolate to temperatures well above and well below its freezing point accordingly as the chocolate is below or above a predetermined temperature, and in keeping the chocolate scraped from said walls during the application of the low temperature.

In testimony whereof I have affixed my signature.

ALONZO LINTON BAUSMAN.